US009733999B1

(12) United States Patent
Frost et al.

(10) Patent No.: US 9,733,999 B1
(45) Date of Patent: Aug. 15, 2017

(54) DYNAMIC OPTIMIZATION OF APPLICATION WORKFLOWS

(71) Applicant: Wells Fargo Bank, N.A., San Francisco, CA (US)

(72) Inventors: David L. Frost, Charlotte, NC (US); Adam Sanders, Huntersville, NC (US); Christopher Shain, Charlotte, NC (US); Jacob Anson Burkey, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/080,018

(22) Filed: Mar. 24, 2016

(51) Int. Cl.
    *G06F 9/54* (2006.01)

(52) U.S. Cl.
    CPC .................................. *G06F 9/546* (2013.01)

(58) Field of Classification Search
    None
    See application file for complete search history.

(56) References Cited

U.S. PATENT DOCUMENTS

| | | |
|---|---|---|
| 6,785,891 B1 | 8/2004 | Allen et al. |
| 6,996,832 B2 | 2/2006 | Gunduc et al. |
| 8,079,015 B2 | 12/2011 | Lind et al. |
| 8,286,186 B2 | 10/2012 | Berry et al. |
| 8,495,594 B2 | 7/2013 | Aupperle et al. |
| 8,613,002 B2 | 12/2013 | Narayanan et al. |
| 8,826,460 B2 | 9/2014 | Wang et al. |
| 8,949,796 B2 | 2/2015 | Howard |
| 9,009,736 B2 | 4/2015 | Walter et al. |
| 9,344,420 B2 | 5/2016 | Dar et al. |
| 9,641,511 B2 | 5/2017 | Dar et al. |
| 2001/0047385 A1 | 11/2001 | Tuatini |
| 2002/0087741 A1 | 7/2002 | Ing et al. |
| 2005/0015355 A1 | 1/2005 | Heller et al. |
| 2005/0140694 A1 | 6/2005 | Subramanian et al. |

(Continued)

OTHER PUBLICATIONS

Sabbouh, M, et al., "Data sharing for Cloud Computing Platforms", 2014 IEEE International Congress on Big Data (BigData Congress), (2014), 621-628.

(Continued)

*Primary Examiner* — Syed Roni
(74) *Attorney, Agent, or Firm* — Schwegman Lundberg & Woessner P.A.

(57) ABSTRACT

Systems and techniques for dynamic optimization of application workflows are described herein. A shared program object may be generated. The shared program object may have a unique identifier. A communication channel may be established. The communication channel may allow access to the shared program object by a first application program using the unique identifier. A subscription request may be received from the first application. The subscription request may request access to the shared program object. A set of services corresponding to the first application may be determined in response to receiving the subscription request. Communication may be facilitated between a service of the set of services corresponding to the first application and a second application via the shared program object. The second application may be subscribed to the shared program object.

21 Claims, 5 Drawing Sheets

(56) References Cited

U.S. PATENT DOCUMENTS

| | | |
|---|---|---|
| 2005/0268308 A1 | 12/2005 | Tang et al. |
| 2006/0036570 A1* | 2/2006 | Schaefer ............. G06F 9/44505 |
| 2008/0091763 A1 | 4/2008 | Devonshire et al. |
| 2010/0257539 A1 | 10/2010 | Narayanan et al. |
| 2011/0061062 A1* | 3/2011 | Chu ........................ G06F 9/546 |
| | | 719/314 |
| 2013/0104103 A1 | 4/2013 | Thunemann et al. |
| 2013/0179906 A1 | 7/2013 | Chou et al. |
| 2013/0339980 A1 | 12/2013 | Meshar et al. |
| 2014/0237486 A1 | 8/2014 | Zhang et al. |

OTHER PUBLICATIONS

Wright, A J, et al., "Sharing data between application programs in building design: Product models and Object-Oriented Programming", Source: Building and Environment, v 27, n 2, (Apr. 1992), 163-171.

\* cited by examiner

DYNAMIC OPTIMIZATION OF APPLICATION WORKFLOWS

TECHNICAL FIELD

The present subject matter relates to the field of application communication. In particular, but without limitation, to dynamic optimization of application workflows.

BACKGROUND

Computers run a variety of applications. Each application may provide a feature or set of features. Several applications installed on a computer may provide similar features. It may be desirable to allow a plurality of applications to exchange messages so that a first application may use a feature available in a second application. Special programming interfaces and or code manipulation may be used to allow the first application to access the feature of the second application. For example, the second application may contain an application programming interface that may provide a framework for the developer of the first application to use to configure interaction and shared feature usage between the first application and the second application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
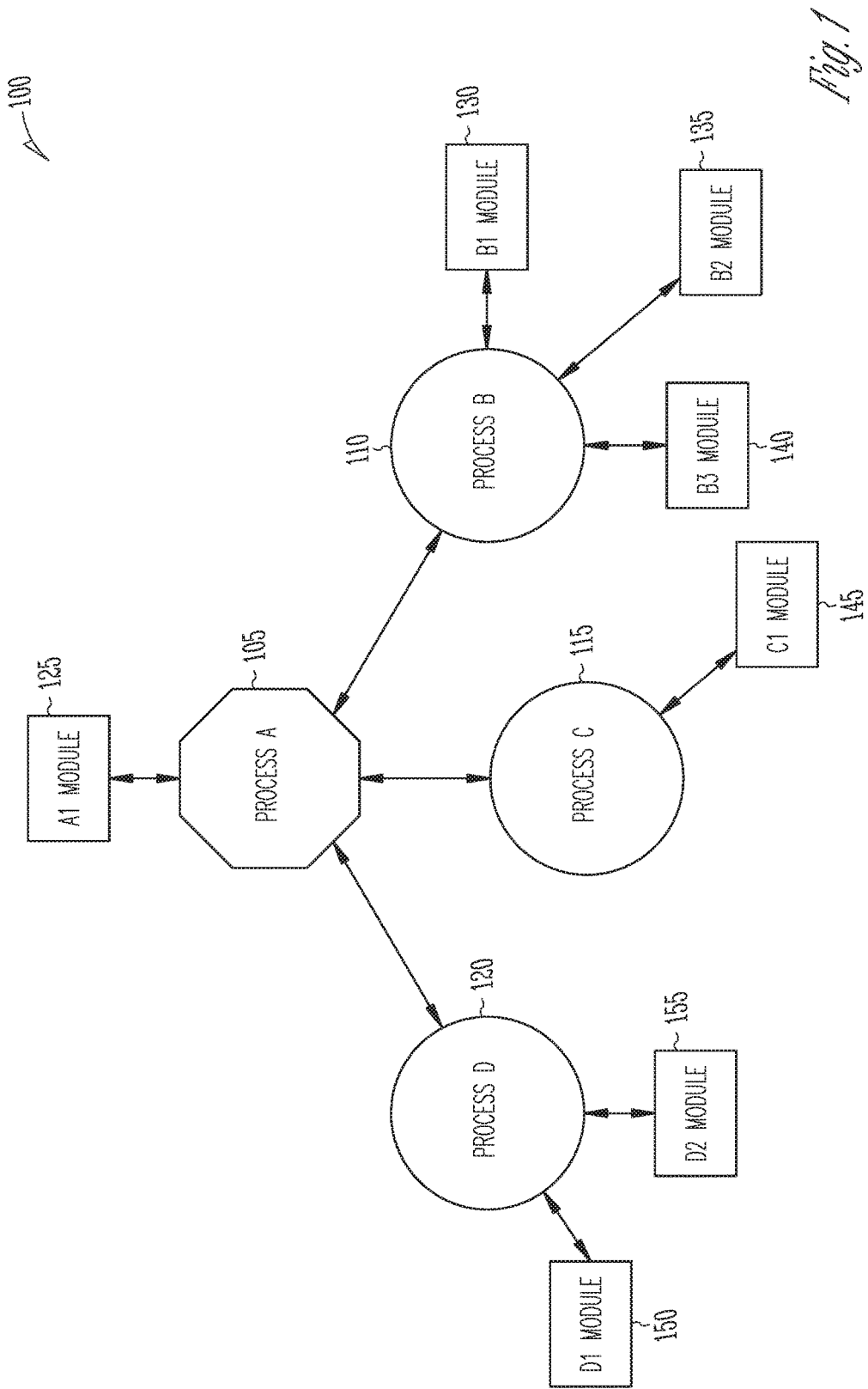
FIG. 1 illustrates a block diagram of an example of a system for dynamic optimization of application workflows, according to various embodiments.

Thousands of applications may be developed and running in an information technology ecosystem. Different development teams (e.g., separated by lines of business, programming language, etc.) may develop applications with similar or redundant features (e.g., an inventory calculation feature, a pricing feature, a data modeling feature, etc.). Redundant development may increase software development expenditures and may lead to extended application development lifecycles. Specially programming interfaces or code manipulation may be used to reduce redundancy. However, additional programming may be necessary for a first application to configure interaction and shared feature usage between the first application and a third application. The present subject matter may be reduce instances of redundant code by providing a zero-configuration, self-discovering, and self-healing mesh topology that may allow applications to automatically detect and connect to one another, thereby decreasing the amount of additional code used to facilitate application workflows (e.g., inter-application communication, intra-application communication, etc.).

The systems and techniques described herein may provide, among other benefits, a zero-configuration, self-discovering, and self-healing mesh topology for inter-application communication. The present subject matter provides a development framework that, when implemented in software applications, may allow each of the applications to communicate with one another thereby allowing feature (e.g., common data, context, functionality, etc.) sharing among the applications. For example, a first application installed on a computer may be able to use a first function of a second application installed on the computer without any special configuration by the end-user (e.g., a user executing the first application, etc.). The described system and techniques may be used for remote application feature sharing (e.g., sharing features of applications installed on multiple computers) by allowing discovery of applications running on a remote computer (e.g., a computer on the local computer's network) capable of sharing features.

The inter-application communication may be considered zero-configuration because configuration by the end-user may be unnecessary. Rather, the framework may be built into each application by a software developer. Thus, when the application is installed it may begin periodically broadcasting and listening for other optimized applications running on the local computer and/or the network. The applications may then use then discover each other and open a communication channel over which messages may be exchanged to allow feature sharing.

It will be understood that the present subject matter may be implemented using a variety of software development environments and/or technologies such as, for example, Java®, Python®, C, Ruby, JavaScript®, C#, PHP, etc. The terms "feature" and "module" are used throughout this disclosure and will be readily understood to refer a block of application code that, when combined, allow the application to perform a set of routines (e.g., initiating computer hardware, performing calculations, performing data manipulations, etc.). It will also be understood that applications may contain a number of features and/or modules that, when combined, comprise the functionality of the application.

The term "communication channel" is used throughout this disclosure and may be readily understood as a data input and data output stream used for exchanging messaging among applications and their respective modules. As used herein, the communication channel may allow for data exchange internal to an application as well as data exchange external to the application (e.g., with other applications running on a local machine, with other applications running on remote computers, etc.). The communication channel may be implemented using a variety of technologies such as, for example, named pipes, TCP/IP, file, etc.

The term "shared program object" as used herein may refer to a program object that may be accessed by multiple applications. The shared program object may allow multiple applications to use shared processing threads. The shared program object may provide interaction with functionality provided by an operating system kernel. The shared program object may be implemented using a variety of techniques such as, for example, mutual exclusion objects (mutex). A mutex may allow applications to lock the mutex providing exclusive use while the lock is in place. Once the mutex is unlocked, another application may lock the mutex for its exclusive use.

In an example embodiment, when an optimized application is initialized it may scan the computer and/or network for a shared application object (e.g., a mutual exclusion class object (mutex), etc.). The shared application object may provide a message exchange through which applications may send and receive messages between various features of each application to implement feature sharing (e.g., workflows). If an instance of the shared application object is found when the application is initialized, the application may send a subscription request to the shared application object to allow participation in the message exchange provided by the shared application object. If an instance of the shared application object is not found when the application is initialized, the application may publish the shared application object. In this regard, the application may become responsible for managing the shared program object and managing subscriptions. Once the shared program object is generated an application network may be formed consisting of subscribed applications. The subscribed applications may request content and reply to requests for content.

In some examples, each application may monitor the status of its connection with the shared application object. In the event the connection is interrupted, the application may begin discovery to determine if control of the shared application object has been transferred to another application. If so, the application may send another subscription message to resume communication in the message exchange. If not, the application may publish the shared application object as described above. Continual (or periodic) monitoring may reduce extended interruptions in the inter-application message exchange by assuring that communication continues as applications terminate. Thus, an inter-application workflow may self-heal.

When a message is received by the shared program object, the shared program object may examine the message envelope and/or metadata. The shared program object may then algorithmically (as discussed further herein) determine the content that is being requested. Likewise, the shared program object may determine a feature of a subscribed application that is capable of providing the determined content. A variety of techniques may be used to determine the requested content such as, for example, pattern matching, best fit, semantic analysis, etc.

While examples are provided describing inter-application feature sharing, it will be readily understood that the shared program object may be used to provide similar functionality for intra-application feature sharing. For example, an application may use the shared program object to access its own internal features.

FIG. 1 illustrates a block diagram of an example of a system 100 for dynamic optimization of application workflows, according to an embodiment. A plurality of processes (e.g., applications, application processes, etc.) such as, for example, process A 105, process B 110, process C 115, and process D 120 may be running on a local computer and/or on a remote computer on a network. Each process of the plurality of processes may have one or more modules (e.g., features, services, etc.) such as, for example, A1 module 125, B1 module 130, B2 module 135, B3 module 140, C1 module 145, D1 module 150, and D2 module 155. The system 100 may be implemented on a computer system (e.g., a local computer, a remote computer, a plurality of computers operating over a network, etc.).

Each of the plurality of applications may contain a code block that contains instructions for implementing feature sharing (e.g., data sharing, context sharing, shared functionality, etc.). In some examples, the instructions may be contained in a separate application to which each of the plurality of applications may be linked.

A shared program object with a unique identifier may be generated. For example, process A 105 may be the first application launched on a local computer. The process A 105 may scan the local computer for a shared program object having a unique identifier (e.g., name, hash code, etc.). For example, a request may be made to the operating system kernel for a list of running applications. In another example, an API call may be issued with a subscription request. The discovery process may be conducted at a polling interval. The process A 105, having been the first process initialized, may not be able to locate the shared program object and may become the active message broker (e.g., controller and/or master of the shared program object). The process A 105 may then generate the shared program object having the unique identifier.

A communication channel may be established allowing a first application to access (e.g., making the shared program object discoverable, sending messages, receiving messages, etc.) the shared program object using the unique identifier. For example, the process A 105 may then establish a communication channel that allows access to the shared program object by other processes. The communication channel may use named pipes.

The first application may transmit a subscription request requesting access (e.g., to send and/or receive messages, etc.) to the shared program object to a process (e.g., the process A 105 may receive a subscription request from a first application program such as the process B 110). In response to receiving the subscription request, a set of services may be determined that correspond to the first application. For example, the set of services may include the B1 module 130, the B2 module 135, and the B3 module 140 of the process B 110. Communication may then be facilitated via the shared program object between a service of the set of services corresponding to the first application and a second application (e.g., between the B1 module 130 of the process B 110 and the process C 115). The shared program object may maintain a catalog of subscribed applications along with a list of services shared by each application.

Furthermore, it may be determined that the shared object does not exist on the computing system and the shared program object may be generated in response to the determination. A message request may be received by the shared program object from the second application for the service of the set of services. It may be determined that a plurality of subscribed applications may be able to fulfill the message request. For example, the first application, a third application, and a fourth application may publish a service catalog indicating the message types to which they can respond (e.g., based on a header information, etc.). In another example, the shared program object may include a catalog that defines the available features of each application are available for sharing. The first application, the third application, and the fourth application may each contain a shared feature that may be capable of responding to a first message type and the shared program object may be able to forward an incoming message of the first message type to any combination of the three applications. Each of the applications may generate a message response using a similar or different manner. For example, each of the applications may use a different algorithm, a different data source, etc. A plurality of responses to the message may be obtained from the plurality of subscribed applications. Thus, a plurality of independent message responses may be received.

A verified message response may be generated by applying a verification algorithm to the plurality of responses. For example, three independent message responses may be received in response to a request for a calculated value. An algorithm may be used to determine the most frequent response. In an example, the verification algorithm may be a voting algorithm. In an example, the voting algorithm may select the verified message response by identifying a most frequent response of the plurality of responses. For example, if two of the three responses have a first calculated value and the third response has a second calculated value, the first calculated value may be returned as the verified message response. The verified message response may be sent to the second application. It will be readily understood that a variety of verification techniques may be utilized to generate a verified message response such as, for example, most recent response, confidence scoring, etc.

For example, the shared program object may receive a response from the D1 module 150 of the process D 120, the C1 module 145 of the process C 115, and the B1 module 130 of the process B 110. The first value may be received from the process D 120 and the process B 110 and a second value may be received from the process C 115. The shared program object may select the first value to send as a verified response based on the majority of the responses having the first value.

In some examples, the communication between the service of the set of services corresponding to the first application and the second application includes version information contained in the messages sent and received between the first and second applications using the shared program object. In some examples, the version may be identified by examining a set of metadata corresponding to a message. The set of metadata may include version information.

The shared program object may be capable of providing forward and backward compatibility for subscribed applications. The shared program object may upgrade or downgrade messages to match an operating version of a subscribed application. In some examples, a first message may be received from the first application for the service of the set of services. The first message may be formatted in a first version. A response to the first message may be received from the second application. The response may be formatted in a second version. The response formatted in the second version may be converted at the shared program object to the first version. The converted response may be sent to the first application.

For example, the process D 120 may have formatted a request in version 1. The shared program object may determine that the module B1 130 of the process B110 is capable of providing the requested content (as previously described). The shared program object may receive a response from the process B 110 formatted in version 2 and the shared program object may convert the response to version 1 before sending the response to the process D 120. Likewise, the process B may send a request for content formatted in version 2 to the shared program object. The shared program object may determine that the module D1 150 of the process D 120 is capable of providing the requested content. The shared program object may convert the response received from the process D 120 formatted in version 1 to version 2 before sending the response to the process B 110.

The shared program object may be operating at a higher (e.g., newer) version level than some subscribed applications. In such instances, the shared program object may be able to upgrade subscribed applications to the higher operating version. In some examples, a first message sent by the first application may be received. The first message may be formatted in a first version. It may be identified that the shared program object has a capability to receive messages formatted in a second version. Instructions may be transmitted to the first application to update the first application to format messages in the second version. In an example, the shared program object may transmit a block of code and/or files to the first application that may be used to update the first application to the second version.

For example, the shared program object may be capable of sending messages in version 3. The process B 110 may be capable of sending messages in version 2. The shared program object may receive a request for content from the process B 110 formatted in version 2. The shared program object may send instructions to the process B 110 to format messages in version 3.

The shared program object may isolate applications that are not able to send and/or receive messages that are capable of being converted. In some examples, the shared program object may receive a first message formatted in a first version. The shared program object may determine that it is not capable of converting messages to the first version. For example, the shared program object may maintain a catalog of forward and backward compatibility of each version. The shared program object may reference the catalog to determine if a message may be converted. The shared program object may forward the request to a second application capable of sending a response formatted in the first version.

In some examples, the shared program object may filter messages that it determines are not relevant so as to minimize broadcast traffic on the network. For example, a message may be received from a first application that requests data not available from any subscribed application. The shared program object may discard the message rather than forwarding the message on to subscribed applications.

Figure 2:
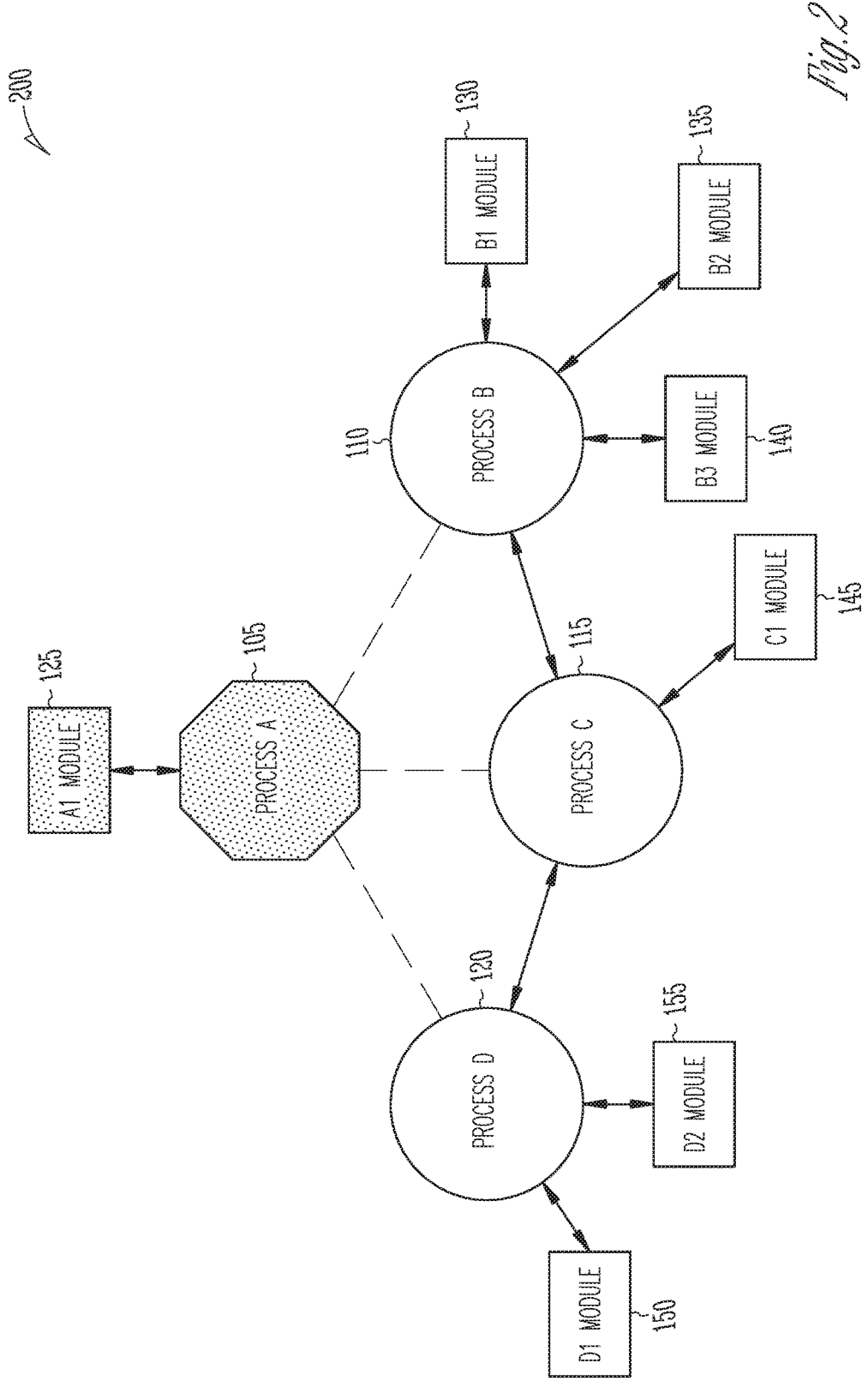
FIG. 2 illustrates a block diagram of an example of a system for dynamic optimization of application workflows, according to various embodiments.

FIG. 2 illustrates a block diagram of an example of a system 200 for dynamic optimization of application workflows, according to an embodiment. System 200 may contain elements similar to those described in FIG. 1. For example, a plurality of processes (e.g., applications, application processes, etc.) such as, for example, process A 105, process B 110, process C 115, and process D 120 may be running on a computer and/or network. Each process of the plurality of processes may have one or more modules (e.g., features, services, etc.) such as, for example, A1 module 125, B1 module 130, B2 module 135, B3 module 140, C1 module 145, D1 module 150, and D2 module 155. The system 200 illustrates a self-healing aspect of the present subject matter in which the process A 105 is no longer available (e.g., the application has been closed, has crashed, or otherwise has become otherwise unresponsive). Each time a process hosting the shared program object becomes unavailable a new shared program object may be hosted by another optimized application on the computer and/or network.

For example, the process C 115 may have been subscribed to the shared program object hosted by the process A 105 as described in FIG. 1. The process C 115 may periodically (e.g., at intervals, continuously, etc.) confirm connectivity to the shared program object hosted by the process A 105. If the process C 115 is unable to verify connectivity with the shared program object it may scan the computer and/or network for another shared program object. If another shared program object is not found, the process C 115 may generate a new shared program object having a unique identifier. The process C may then establish a communication channel allowing access to the new shared communication object. Other applications, such as, for example, the process B 110 and the process D 120 may send subscription requests to the process C 105 using the unique identifier having been likewise unable to verify connectivity with the shared program object.

The process C 115 may receive the subscription requests and allow access to the new shared program object. The process C 115 may then determine a set of services corresponding to each of the other applications upon receiving the respective subscription requests. For example, upon receiving a subscription request from process B 110, it may be determined that the B1 module 130, the B2 module 135, and the B3 module 140 are available for sharing by the process B 110. Communication may then be facilitated between a service of the set of services and a second application via the new shared program object.

For example, the process B 110 and the process D 120 may both be subscribed to the new shared program object hosted by the process C 115. The D1 module 150 of the process D 120 may send a message to the new shared program object hosted by the process C 115 requesting a particular type of response (e.g., a inventory count for a particular item, a price of a security, a calendar object, etc.). The new shared program object may have identified that the B2 module 135 of the process B2 is capable of fulfilling the request received from the process D 120. The new shared program object may transmit the request to the process B 110 or directly to the B2 module 135 requesting the response. The new shared program object may receive the response and transmit it to the process D 120 or directly to the D1 module 150. Thus, the new shared program object enables each of the subscribed applications to share common data, context, and functionality.

In some examples, the shared program may remain resident upon termination of the first application. The second application may determine that the first application is no longer in control of the shared program object. The second application may take control of the shared program object rather than generating a new shared program object. For example, the shared program object may be initiated as a separate process by the first application. When a process corresponding to the first application terminates and the association between the first application and the shared program object is broken, the separate process corresponding to the shared program object may remain resident in memory. The second application may determine that the shared program object does not have an association to another application and may create a new association between the second application and the shared program object thereby taking control of the shared program object.

In some examples, discovery may be initiated to determine an application with a most recent version of the shared program object. For example, the process B 110 may contain version 1 of the shared program object, the process D 120 may contain version 2 of the shared program object, and the process C 115 may contain version 3 of the shared program object. The process C 115 may be selected to host the new shared program object because it contains the most recent version of the shared program object.

Figure 3:
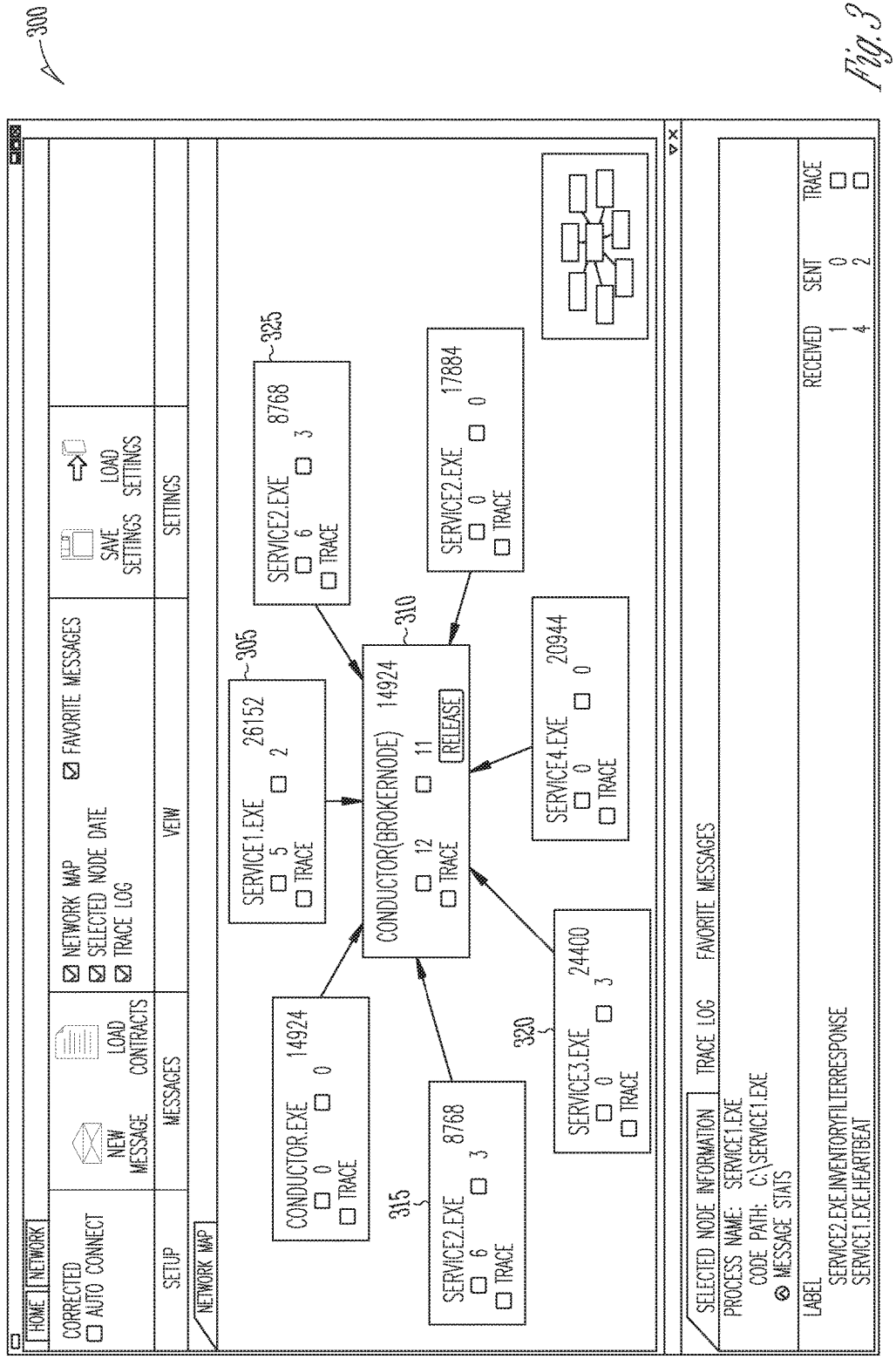
FIG. 3 illustrates an example of graphical user interface for use in implementing dynamic optimization of application workflows, according to various embodiments.

FIG. 3 illustrates an example of graphical user interface (GUI) 300 for use in implementing dynamic optimization of application workflows, according to an embodiment. The GUI 300 represents an example of an administrative console for viewing and managing an application network implementing dynamic optimization of application workflows as described in FIGS. 1 & 2.

The GUI 300 may contain a network map including a plurality of nodes representing application processes (e.g., services, features, etc.) such as, for example, service1.exe 305 (e.g., a first service of a subscribed application), conductor 310 (e.g., the shared program object as discussed in FIGS. 1 & 2), service2.exe 315 (e.g., a second service of a subscribed application), service3.exe 320 (e.g., a third service of a subscribed application), and service3.RuntimeAdapter 325 (e.g., a fourth service of a subscribed application). At the center of the map may be a broker node such as, for example, the conductor 310. Each node may signify a service that is available for sharing as described in FIGS. 1 & 2.

Applications may subscribe to the conductor 310 as described in FIGS. 1 & 2. The subscribed applications may send requests to the conductor 310 for data from one of the service nodes (e.g., service1.exe 305, service2.exe 315, etc.). Each of the service nodes may send a response to the request including requested data.

The GUI 300 may provide a variety of configuration options such as configuring the catalogs discussed in FIG. 1. The catalogs may provide a variety of components that may provide structural definition for message and data exchange between subscribed applications and shared services. For example, contracts may be used to provide a schema for data exchange between applications subscribed to the shared program object. Data contracts may be used to describe data types that may be exchanged. Message contracts may be used to describe message structure of the messages that may be exchanged between each of the subscribed applications. The GUI 300 may provide a selectable element that, when selected, allows contracts to be loaded into the network for use by the shared program object in facilitating message exchange. It will be understood that the GUI 300 may be used to complete a variety of additional administrative and maintenance tasks as they relate to dynamic optimization of application workflows as described in FIGS. 1 & 2.

Figure 4:
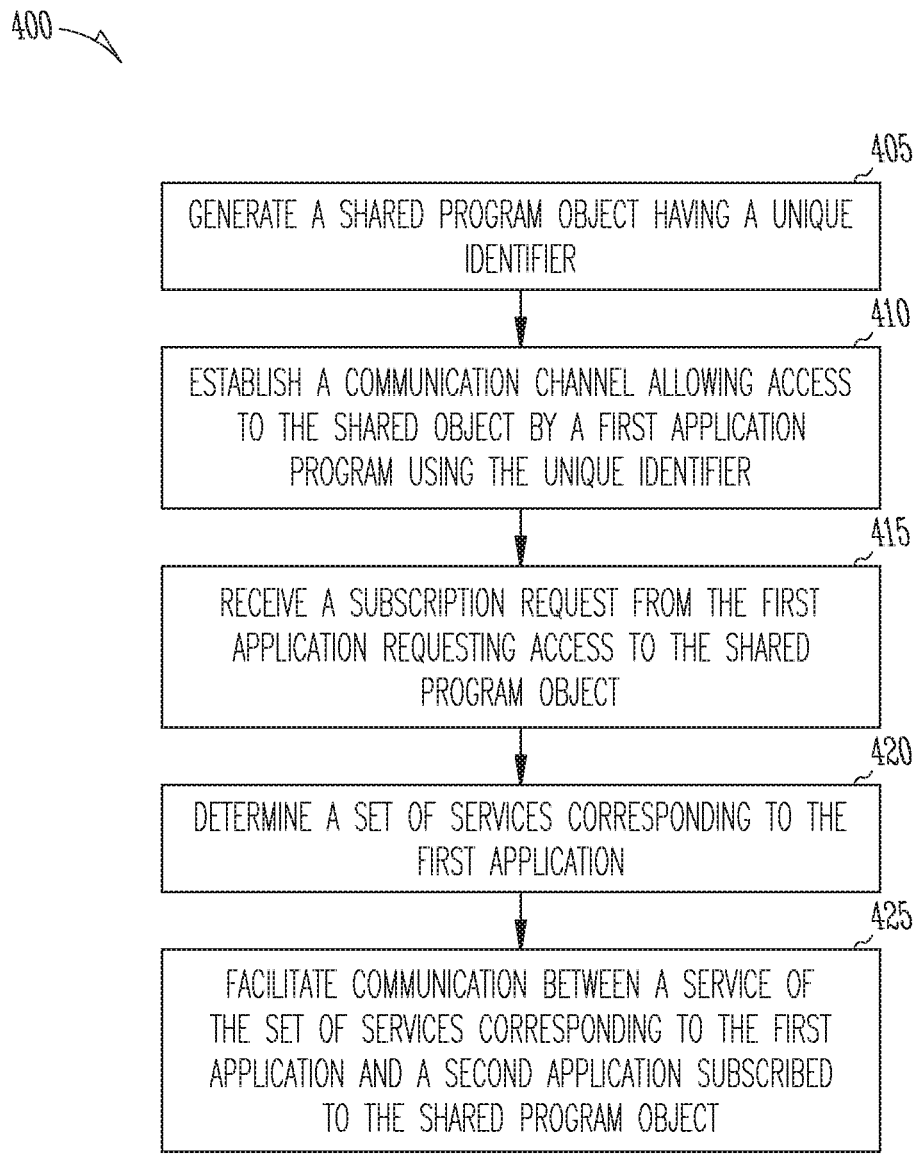
FIG. 4 illustrates flow diagram of an example of a method for dynamic optimization of application workflows, according to various embodiments.

FIG. 4 illustrates flow diagram of an example of a method 400 for dynamic optimization of application workflows, according to an embodiment. The method 400 is an example method for implementing zero-configuration messaging on a computing system using an active messaging broker. At operation 405, a shared program object may be generated. The shared program object having a unique identifier. In an example, the shared program object may be a mutual exclusion object. In some examples, It may be determined that the shared object does not exist on the computing system and the shared program object is generated in response to the determination. At operation 410, a communication channel may be established. The communication channel may allow access to the shared program object by a first application using the unique identifier. In an example, the communication channel may use named pipes. At operation 415, a subscription request may be received from the first application. The subscription request may request access to the shared program object. At operation 420, a set of services corresponding to the first application may be determined in response to receiving the subscription request. At operation 425, communication may be facilitated between a service of the set of services corresponding to the first application and a second application via the shared program object. The second application may be subscribed to the shared program object.

In some examples, a message request may be received from the second application for the service of the set of services. It may be determined that a plurality of subscribed applications are able to fulfill the message request. A plurality of responses to the message may be received from the plurality of subscribed applications. A verified message response may be generated by applying a verification algorithm to the plurality of responses. The verified message response may be sent to the second application.

In some examples, the communication between the service of the set of services corresponding to the first application and the second application may include version information contained in messages sent and received between the first and second applications using the shared program object. In an example, a version may be identified by examining a set of metadata corresponding to a message. The set of metadata may include version information.

In some examples, a first message may be received from the first application for the service of the set of services. The first message may be formatted in a first version. A response to the first message may be received from the second application. The response may be formatted in a second version. The response formatted in the second version may be converted to the first version at the shared program object. The converted response may be sent to the first application. In some examples, a first message sent by the first application may be received. The first message may be formatted in a first version. It may be identified that the shared program object has a capability to receive messages formatted in a second version. Instructions may be transmitted to the first application to update the first application to format messages in the second version.

Figure 5:
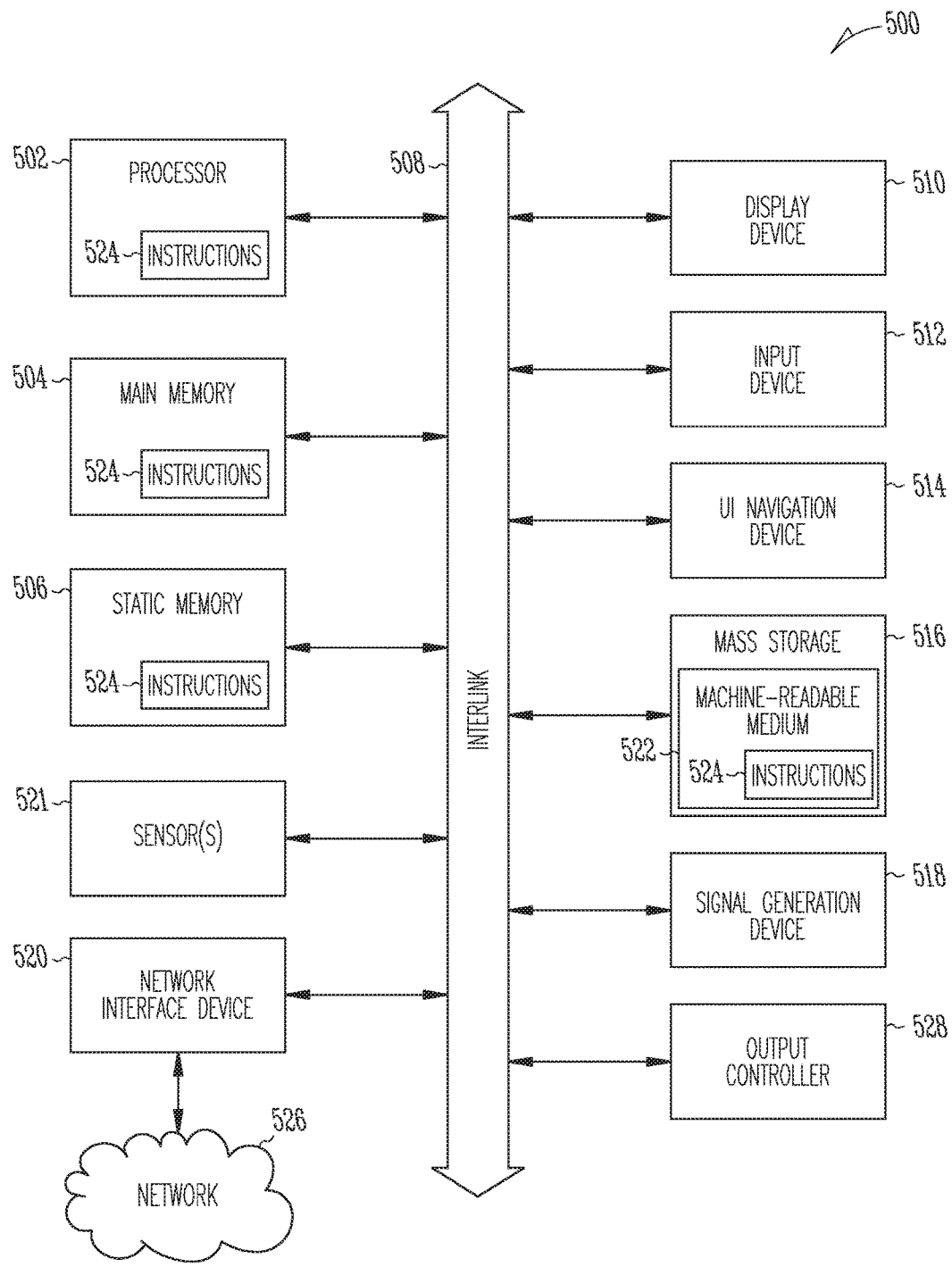
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for implementing zero-configuration messaging on a computing system using an active messaging broker, the system comprising:
   at least one processor;
   a memory including instructions that, when executed by at least one processor, configure the at least one processor to:
   generate a shared program object, the shared program object having a unique identifier;
   establish a communication channel, the communication channel allowing access to the shared program object by a first application program using the unique identifier;
   receive a subscription request from the first application, the subscription request requesting access to the shared program object;
   in response to receiving the subscription request, determine a set of services corresponding to the first application; and
   facilitate communication, via the shared program object, between a service of the set of services corresponding to the first application and a second application, the second application being subscribed to the shared program object, wherein the communication between the service of the set of services corresponding to the first application and the second application includes version information contained in messages sent and received between the first and second applications using the shared program object.

2. The system of claim 1, wherein the shared program object is a mutual exclusion object.

3. The system of claim 1; wherein the instructions further include instructions to:

determine that the shared object does not exist on the computing system; and generate the shared program object in response to the determining that the shared object does not exist on the computing system.

4. The system of claim 1; wherein the instructions further include instructions to:

receive a message request from the second application for the service of the set of services;

determine that a plurality of subscribed applications are able to fulfill the message request;

obtain a plurality of responses to the message from the plurality of subscribed applications;

generate a verified message response by applying a verification algorithm to the plurality of responses; and send the verified message response to the second application.

5. The system of claim 4, wherein the generated verified message includes a most frequent response determined from the plurality of responses.

6. The system of claim 1, wherein the instruction further include instructions to:

receive a first message from the first application for the service of the set of services, the first message being formatted in a first version;

receive a response; to the first message, from the second application, the response formatted in a second version;

convert, at the shared program object, the response formatted in the second version to the first version; and send the converted response to the first application.

7. The system of claim 1, wherein the instruction further include instructions to:

receive a first message sent by the first application, the first message formatted in a first version;

identify that the shared program object has a capability to receive messages formatted in a second version; and transmit instructions to the first application to update the first application to format messages in the second version.

8. A non-transitory computer readable medium including instructions for implementing zero-configuration messaging on a computing system using an active messaging broker that, when executed by at least one processor, configure the at least one processor to:

generate a shared program object, the shared program object having a unique identifier;

establish a communication channel, the communication channel allowing access to the shared program object by a first application program using the unique identifier;

receive a subscription request from the first application, the subscription request requesting access to the shared program object;

in response to receiving the subscription request, determine a set of services corresponding to the first application; and facilitate communication, via the shared program object, between a service of the set of services corresponding to the first application and a second application, the second application being subscribed to the shared program object wherein the communication between the service of the set of services corresponding to the first application and the second application includes version information contained in messages sent and received between the first and second applications using the shared program object.

9. The computer readable medium of claim 8, wherein the shared program object is a mutual exclusion object.

10. The computer readable medium of claim 8, wherein the instructions further include instructions to:

determine that the shared object does not exist on the computing system; and generate the shared program object in response to the determining that the shared object does not exist on the computing system.

11. The computer readable medium of claim 8, wherein the instructions further include instructions to:

receive a message request from the second application for the service of the set of services;

determine that a plurality of subscribed applications are able to fulfill the message request;

obtain a plurality of responses to the message from the plurality of subscribed applications;

generate a verified message response by applying a verification algorithm to the plurality of responses; and send the verified message response to the second application.

12. The computer readable medium of claim 11, wherein the generated verified message includes a most frequent response determined from the plurality of responses.

13. The computer readable medium of claim 8, wherein the instructions further include instructions to:

receive a first message from the first application for the service of the set of services, the first message being formatted in a first version;

receive a response, to the first message, from the second application, the response formatted in a second version;

convert, at the shared program object, the response formatted in the second version to the first version; and send the converted response to the first application.

14. The computer readable medium of claim 8, wherein the instructions further include instructions to:

receive a first message sent by the first application, the first message formatted in a first version;

identify that the shared program object has a capability to receive messages formatted in a second version; and transmit instructions to the first application to update the first application to format messages in the second version.

15. A method for implementing zero-configuration messaging on a computing system using an active messaging broker, the method comprising:

generating a shared program object, the shared program object having a unique identifier;

establishing a communication channel, the communication channel allowing access to the shared program object by a first application program using the unique identifier;

receiving a subscription request from the first application, the subscription request requesting access to the shared program object;

in response to receiving the subscription request, determining a set of services corresponding to the first application; and facilitating communication, via the shared program object, between a service of the set of services corresponding to the first application and a second application, the second application being subscribed to the shared program object, wherein the communication between the service of the set of services corresponding to the first application and the second application includes version information contained in messages sent and received between the first and second applications using the shared program object.

16. The method of claim 15, wherein the shared program object is a mutual exclusion object.

17. The method of claim 15, further comprising:
determining that the shared object does not exist on the computing system; and
generating the shared program object in response to the determining that the shared object does not exist on the computing system.

18. The method of claim 15, further comprising:
receiving a message request from the second application for the service of the set of services;
determining that a plurality of subscribed applications are able to fulfill the message request;
obtaining a plurality of responses to the message from the plurality of subscribed applications;
generating a verified message response by applying a verification algorithm to the plurality of responses; and
sending the verified message response to the second application.

19. The method of claim 18, wherein the generated verified message includes a most frequent response determined from the plurality of responses.

20. The method of claim 15, further comprising:
receiving a first message from the first application for the service of the set of services, the first message being formatted in a first version;
receiving a response, to the first message, from the second application, the response formatted in a second version;
converting, at the shared program object, the response formatted in the second version to the first version; and
sending the converted response to t first application.

21. The method of claim 15, further comprising:
receiving a first message sent by the first application, the first message formatted in a first version;
identifying that the shared program object has a capability to receive messages formatted in a second version; and
transmitting instructions to the first application to update the first application to format messages in the second version.

* * * * *

UNITED STATES PATENT AND TRADEMARK OFFICE
CERTIFICATE OF CORRECTION

PATENT NO. : 9,733,999 B1
APPLICATION NO. : 15/080018
DATED : August 15, 2017
INVENTOR(S) : Frost et al.

Page 1 of 1

It is certified that error appears in the above-identified patent and that said Letters Patent is hereby corrected as shown below:

In the Claims

In Column 12, Line 66, in Claim 3, delete "claim 1;" and insert --claim 1,-- therefor In Column 13, Line 6, in Claim 4, delete "claim 1;" and insert --claim 1,-- therefor In Column 13, Line 27, in Claim 6, delete "response;" and insert --response,-- therefor In Column 13, Line 62, in Claim 8, after "object", insert --,--

In Column 16, Line 12, in Claim 20, delete "t" and insert --the-- therefor

Signed and Sealed this
Twenty-fourth Day of April, 2018

Andrei Iancu
*Director of the United States Patent and Trademark Office*